May 20, 1969 P. J. PENA 3,445,843

PIEZOELECTRIC SIGNALING DEVICE

Filed June 29, 1966 Sheet 1 of 2

INVENTOR.
PASCUAL J. PENA

BY

Spencer E. Olson

ATTY.

United States Patent Office 3,445,843
Patented May 20, 1969

3,445,843
PIEZOELECTRIC SIGNALING DEVICE

Pascual J. Pena, Chicago, Ill., assignor to Automatic Electric Laboratories, Inc., Northlake, Ill., a corporation of Delaware Continuation-in-part of application Ser. No. 511,958, Dec. 6, 1965. This application June 29, 1966, Ser. No. 561,537
Int. Cl. G08b 3/10
U.S. Cl. 340—392 1 Claim

ABSTRACT OF THE DISCLOSURE

A gong-type telephone ringer has a piezoelectric bender element which is clamped at one end and carries a clapper at the other end. The clapper is attached to the element through the medium of a resilient strip. Upon energization by an A.C. voltage, the element vibrates in flexural mode and the clapper strikes the gong.

The present application is a continuation-in-part of my application Ser. No. 511,958 filed Dec. 6, 1955, which is assigned to the same assignee as this application.

This invention relates to ringers for telephone subsets and in particular to ringers employing a piezoelectric transducer.

In U.S. Patent 3,218,636 issued to J. M. Bernstein and N. S. Suloway on Nov. 16, 1965, there has been described a piezoelectric signaling device for use in telephone signaling systems.

This patent shows an arrangement for a telephone ringer that is simpler in construction and requires fewer parts than electrodynamic ringers. A ring shaped piezoelectric element is mounted on a base in close proximity to a pair of gongs and, upon excitation, the piezoelectric element vibrates and strikes the gongs.

Although this arrangement has been found to work satisfactorily, the piezoelectric element must be clamped at or very close to points which correspond to nodes if displacement sufficient to actuate the gongs is to be obtained. Consequently, in this arrangement the clamping of the element is critical.

It is therefore an object of this invention to provide a new and improved telephone ringer.

Another object of this invention is to provide telephone ringers having a piezoelectric clapper element that does not require critical mounting.

Another object of this invention is to provide a telephone ringer having an improved sound output level.

The ringer proposed uses an elongated piezoelectric element which is operable in flexural mode. The element is clamped at one end while the other end, which is located near a pair of gongs, preferably carries a clapper. The element is excited with an AC electric field applied to the clamped end. Upon excitation, the free end moves the clapper which in turn strikes the gongs.

These and other objects and features will become more apparent from the subsequent detailed description which makes reference to the following drawings.

Figure 1:
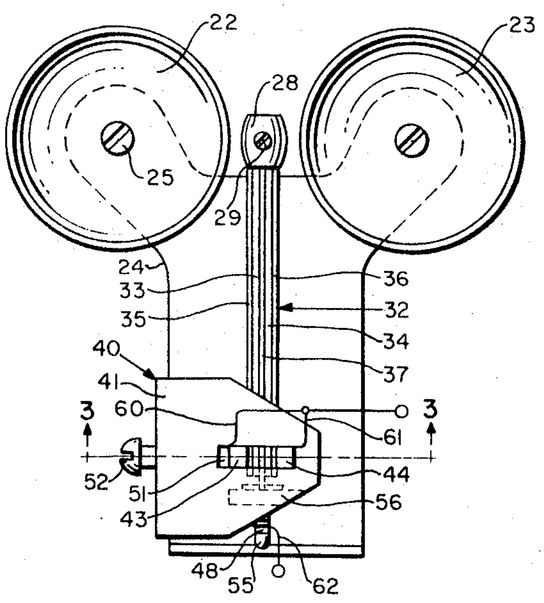
FIG. 1 is a plan view of a ringer employing a piezoelectric transducer according to the invention.

Referring to FIG. 1, a telephone ringer has gongs 22 and 23 mounted on a base plate 24 by means of screws 25. An oscillatory structure including a piezoelectric element 32 is also mounted to the base plate by means of a clamp assembly 40 and carries a clapper 28 on its free end.

Figure 3:
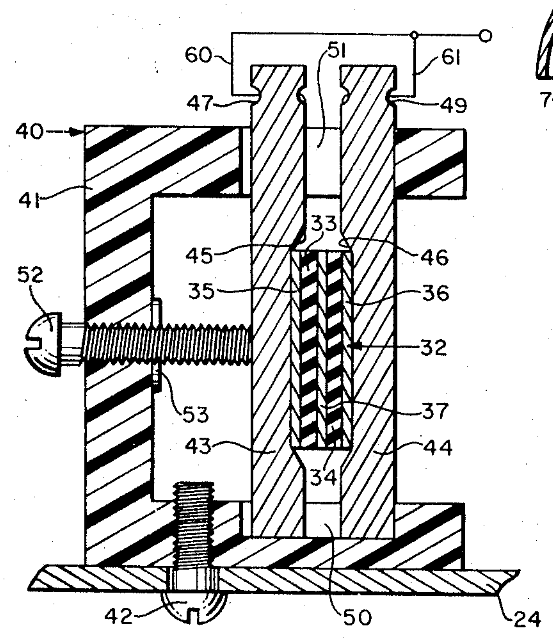
FIG. 3 is an enlarged view taken along 3—3 of FIG. 1 showing the arrangement for mounting the piezoelectric transducer assembly to the base plate.

The element 32, shown in FIG. 3, consists of a pair of elongated planar ceramic strips 33 and 34 which have been bonded to a thin electrode 37 and which have been polarized in such a way that the element will flex upon application of a voltage. The strips, which are formed of a material such as lead zirconate-titanate, are rectangular in cross-section and each strip is approximately 2 inches long and has a cross-sectional area of approximately ⅛ square inch. To energize the element, a signal source is connected between the center electrode 37 and the outer surfaces of each strip. The surfaces have been provided with conductive strips or a coating 35 and 36 of conductive material such as silver, so that the electric field generated by the signal applied, will be distributed uniformly around the element.

The clamp assembly 40 which holds the element consists of a mounting block 41, clamping bars 43 and 44, and a terminal clip 55.

The mounting block is preferably molded from an insulating material and is attached to the base plate 24 by means of screws 42 which in turn are received by tapped holes in the block. The block also is provided with a groove 50 and a slot 51 which receive the ends of the clamping bars.

The clamping bars are formed of a rigid conducting material such as copper or steel and are rectangular in shape. One end of each bar is located in the groove 50 while the other end extends through slot 51 in the top of the block. The upper ends of the bars have been formed as terminal posts 47 and 49 and receive signal leads 60 and 61 which, in turn, are connected to an A.C. voltage source. Each of the clamping bars has an indentation, 45 and 46 formed on the surface adjacent to the element 32. These indentations both support and position the element when it is clamped.

Figure 2:
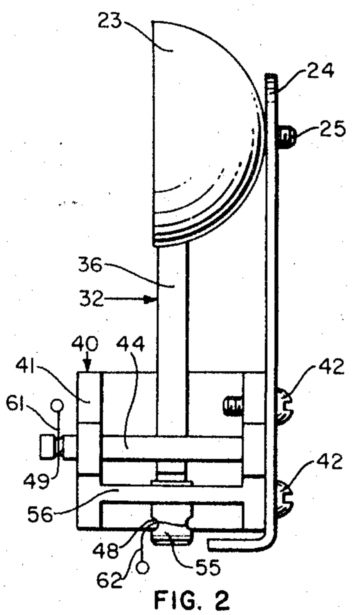
FIG. 2 is a side view of the ringer shown in FIG. 1.

The terminal clip 55 is carried by a rigid strut 56 shown in FIG. 2, which is an integral part of the mounting block. The clip, which is formed of resilient conducting material, is attached to the center electrode of the element and serves as electrical terminal means. The clip has a terminal post 48 formed on one end to which is attached a signal lead 62.

The element is inserted between the clamping bars adjacent indentations 45 and 46 formed in the bars. It should be noted that the clamping of the element is not critical when the type of element described above is used, although more deflection is obtainable when the element is clamped near one end and with the end of the element extending somewhat beyond the clamp.

The bars are moved into clamping engagement with the element by means of a screw 52 extending through a tapped hole in the mounting block and having one end abutting a surface of bar 43. As can be seen in FIG. 3, as the screw 52 is turned into the bar 43, clamping bar 44 is forced against one side of the slot 51 and one side of the groove 50 in the mounting block and clamping bar 43 is moved toward clamping bar 44 by the screw so that the element becomes wedged between the two bars. It should be noted that the slot 51 and the groove 50 have been designed to be wider than necessary in order to permit easier insertion of the element into the clamp prior to the tightening of the screw 52.

Upon excitation, the piezoelectric element will cause some vibrations in the various members of the clamping assembly. Although these vibrations are not sufficient to cause the screw 52 to back off from the surface 43 of the element, lock washer 53 has been provided to guard against the possibility of this occurrence.

The assembly serves not only to mount the element, but also to provide electrical terminals for connecting the element to the signal source.

As has already been mentioned, the surfaces of each of the strips are coated with a conductive material so that when the element is clamped, the bars, which are in contact with these surfaces near one end of the element, serve as conducting means between these surfaces and the leads 60 and 61 connected to the signal source.

After the element has been clamped, the terminal clip 55 is attached to the center electrode 37 in order to provide electrical access to the electrode.

The element may be connected to a signal source by either a series connection or a parallel connection. The choice of connection depends on the particular application.

The parallel connection is more desirable for applications involving telephone ringers because the greatest displacement is obtainable when a parallel connection is used.

To provide parallel connection, the outer conducting surfaces of strips 33 and 34 are connected together by means of leads 60 and 61 on terminals 47 and 49. Leads 60 and 62 are then connected between terminals of the signal source.

The free end of the element carries clapper 28. Although the gongs could be excited if struck by the free end of the element without the use of a clapper, the tone quality of the ringer is better when a metallic clapper is used. The clapper is positioned at a particular point near the free end of the element and is maintained at this point by means of set screw 29. The clapper is insulated from the conductive surfaces 35 and 36 and from the center electrode 37.

The element may be mechanically tuned to its resonant frequency by adjusting the position of the clapper. The resonant frequency of the element depends on both the material and the dimensions of the element. For elements of the type described above, it has been possible to obtain resonant frequencies in the range of 16 c.p.s.–200 c.p.s.

Upon energization, the element vibrates in flexural mode, so that the element is flexed in an oscillatory manner with the free end of the element being driven back and forth, in a direction substantially normal to the planar extent of the element, throughout each full oscillatory cycle of the element, as long as the A.C. voltage remains applied to the conductive strips. The frequency of vibration is determined by the frequency of the signal that is applied. The energy needed to operate this ringer is much less than that required by conventional electromechanical ringers presently used in telephone sets, so that this ringer can be used with either electronic or electromechanical switching systems. Furthermore, this ringer design eliminates the need for the coils and magnet required by electromagnetic ringers thereby providing a ringer that is more compact and simpler in construction.

Because the element used is composed of two ceramic strips, more deflection is obtained than when a homogeneous type element, such as the one shown in the Bernstein et al. patent mentioned above, is used, and consequently, the sound output level obtained when the clapper strikes the gongs will be higher.

If certain mounting modifications are made, the piezoelectric element that has been described could be replaced by one that is capable of vibrating in either torsional or twisting modes, or the element could consist of a single strip, rather than a pair of strips, and have the center electrode replaced by a number of conductive impurity regions to permit polarization of the element.

Figure 4:
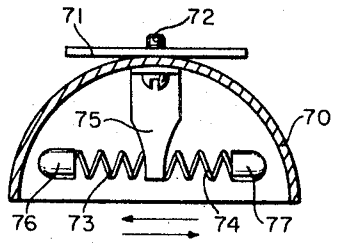
FIGS. 4, 5 and 6 show embodiments of the invention which employ piezo-spring elements.
Figure 5:
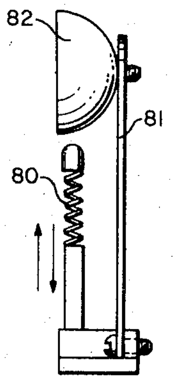
Figure 6:
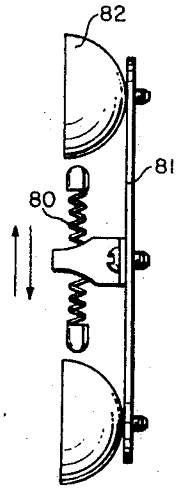

FIGS. 4, 5 and 6 show embodiments of the invention which employ piezo-spring elements. Each element is in the form of a coil-shaped ceramic strip and is preferably made of a homogeneous material. The element is clamped at one end and is polarized in such a way that, upon energization, the free end of the element moves back and forth along a straight line that can be drawn between the point at which the element is clamped and the free end of the element. A clapper carried by the free end of the element is moved to strike the gongs whenever the element is energized.

An arrangement for a ringer is shown in FIG. 4, wherein the element is mounted within the gong. This embodiment shows a gong 70 mounted to a base 71 by means of a screw 72 and piezo-spring elements 73 and 74 mounted to the base within the gong by means of a clamping assembly 75. Each of the piezo-spring elements is clamped at one end and carries a clapper 76, 77 on a free end.

FIGS. 5 and 6 show alternative arrangements wherein a piezo-spring element 80 is mounted on a base 81 adjacent gong 82.

The assemblies shown in FIG. 4 and FIG. 6 may include a single piezo-spring element which is clamped at or near the middle and which carries a clapper on either end. An assembly of this type would require simpler clamping arrangements than would be required for two separate elements.

In each of the elements in FIGS. 4 and 6, the number of loops required for each element would be determined by the amount of the deflection that is needed and to some extent would be a function of the material that is used and the dimensions of the material.

Figure 7:
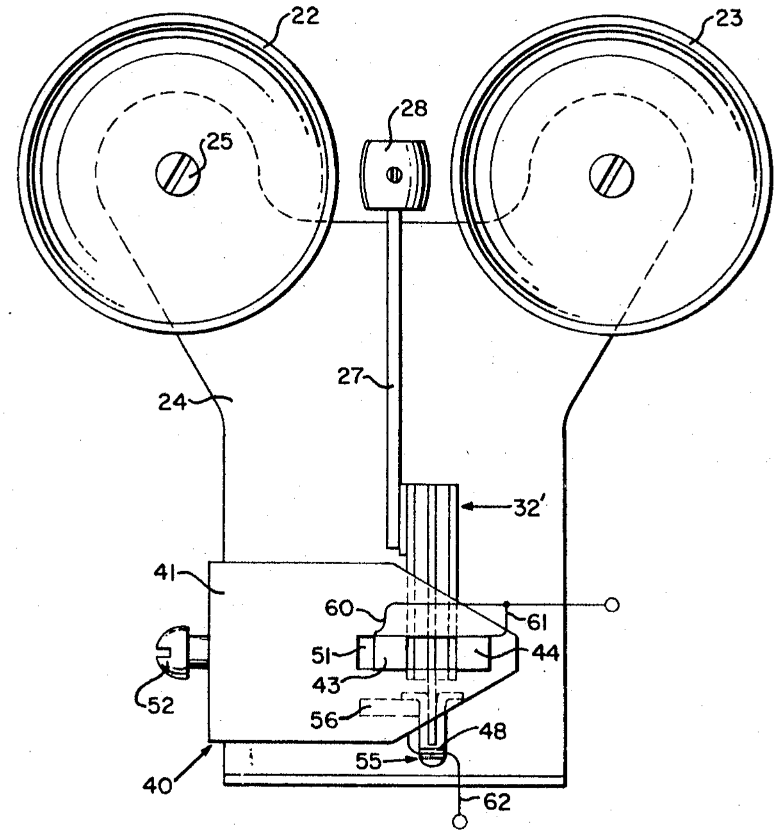
FIG. 7 is a plan view of the ringer of FIG. 1 having a modified clapper assembly; and, FIG. 8 is a view of a clapper assembly for the ringer shown in FIG. 7.
Figure 8:
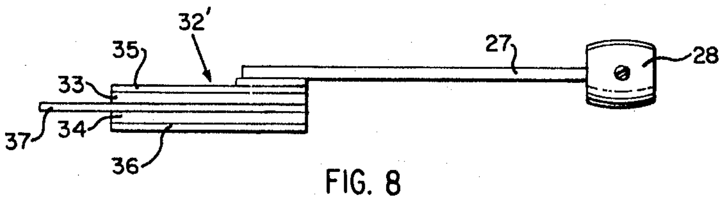

In FIGS. 7 and 8, it is illustrated how the oscillatory structure of the ringer of FIG. 1 has been modified by shortening the element 32′, attaching one end of a flexible rod 27 of a length greater than the length of the element to the free end of the element, and attaching a clapper 28 to the free end of the rod. It should be noted that the rod 27 is attached to the free end of the element 32′ at a point substantially beyond the point at which the element is clamped so that the full extent of the rod is displaceable relative to the point at which the element is held in the clamp 40. The use of this modified clapper arrangement has certain advantages over the use of an arrangement whereby the clapper is attached directly to the element. The modified clapper assembly is capable of greater deflection and consequently will produce a higher more harmonious sound output. Furthermore, this arrangement is more economical because less piezoelectric material is required.

From the foregoing description, it will be seen that the present invention has provided a new and improved telephone ringer that requires less energy to operate and is more compact than conventional electromechanical ringers. The new ringer employs a piezoelectric clapper element that does not require critical mounting. A metallic clapper may be attached to the free end of the element to provide a higher sound output. Alternatively, the clapper may be attached to the element through the medium of a resilient strip.

The embodiment shown in FIGS. 4–6 is not claimed in this application, but is claimed in my co-pending U.S. application S.N. 511,958, filed Dec. 6, 1965.

What is claimed is:

1. A telephone ringer for operation upon application of an alternating current voltage, said ringer comprising:

a base;

an elongated piezoelectric element including a pair of polarized ceramic strips each having an inner planar surface bonded to a flat conductive strip, and an outer planar surface having conductive material disposed thereon, said outer conductive surfaces being electrically connected together;

means for clamping said element at a point near one end to said base and for applying said A.C. voltage between said conductive strip and said outer conducting surfaces;

a resilient strip of a length greater than the length of said element having one end attached to the free end of said element at a point substantially beyond the point at which said element is clamped so that the full extent of said resilient strip is displaceable relative to the point at which said element is clamped;

clapper means attached to the other end of said resilient strip, said element being flexed in an oscillatory manner with the free end of said element being driven back and forth, in a direction substantially normal to the planar surfaces of said element, throughout each full oscillatory cycle of said element, as long as said A.C. voltage remains applied to said conductive strips, said resilient strip being carried back and forth by the free end of said element when said element is driven;

and gong means mounted on said base adjacent said clapper means so as to be intermittently struck thereby.

References Cited

UNITED STATES PATENTS

| | | | |
|---|---|---|---|
| 2,875,353 | 2/1959 | Cavalieri et al. | 310—8.5 X |
| 3,027,554 | 3/1962 | Cassell | 340—396 X |
| 3,127,602 | 3/1964 | Russo et al. | 340—392 |
| 3,218,636 | 11/1965 | Bernstein et al. | 340—392 |
| 3,225,226 | 12/1965 | Kawakami | 310—8.3 X |

THOMAS B. HABECKER, *Primary Examiner.*

C. M. MARMELSTEIN, *Assistant Examiner.*

U.S. Cl. X.R.

310—8.1, 8.6; 340—397, 401